TT

W. M. CHASE 3,564,447

JLATING INTERMODULATION DISTORTION
CREATED BETWEEN A PLURALITY OF RADIO FREQUENCY
SIGNALS BY ENVIRONMENTAL NONLINEARITIES
Filed Oct. 24, 1966

INVENTOR.
WALTER M. CHASE
BY J. Peter Mohn
AGENT
Paul N. Critchlow
ATTORNEYS

United States Patent Office 3,564,447
Patented Feb. 16, 1971

3,564,447
APPARATUS FOR SIMULATING INTERMODULATION DISTORTION CREATED BETWEEN A PLURALITY OF RADIO FREQUENCY SIGNALS BY ENVIRONMENTAL NONLINEARITIES

Walter M. Chase, San Diego, Calif., assignor to the United States of America as represented by the Secretary of the Navy Filed Oct. 24, 1966, Ser. No. 589,139
Int. Cl H03b *21/00*
U.S. Cl. 331—42 4 Claims

ABSTRACT OF THE DISCLOSURE

A plurality of radio frequency sources provide different discrete radio frequency signals that are mixed in a nonlinear mixing device that is selected to simulate the effect of naturally occurring nonlinear junctions in a communications system. The resulting intermodulation interference is supplied to a frequency monitoring device wherein the interference may be observed whereby interference-free receiving frequencies can be selected in accordance with the results of the simulation.

The invention described herein may be manufactured and used by or for the Government of the United States of America for governmental purposes without the payment of any royalties thereon or therefor.

This invention relates to apparatus for simulating radio interference and more particularly to a device which simulates the intermodulation products which occur when a plurality of radio frequency signals mix in a non-linear element.

In many communication system environments it may be necessary to operate a plurality of radio frequency transmitters simultaneously on various different frequencies. The surroundings of the environment, or communication station, oftentimes contain naturally occurring non-linear junctions. The effect of these non-linear junctions is the generation of cross products or intermodulation products between the various simultaneous transmitting frequencies. These new intermodulation product frequencies may well include frequencies which coincide with desired receiving frequencies within the communications system thus resulting in interference with the receiving operation.

A typical example of the above noted problem is the situation occurring aboard a Navy ship. Because of the multitudes of various communication links aboard such a ship it is often common for a number of transmitters of different frequencies to be operating simultaneously. It has been found that there are a number of naturally occurring non-linear junctions on shipboard. They occur at riveted and bolted metallic junctions, at areas of rust and corrosion on cable armor, and at various other parts above deck. Furthermore it is known that when current densities in a ferromagnetic material, such as a ship's hull, are high, the material is non-linear and consequently can generate intermodulation products. If fundamental currents from the noted array of transmitters flow through one of the naturally occurring non-linearities, intermodulation products are generated. If these signals are then radiated from a portion of the ship's structure one or more of the intermodulation products may fall on one of the ship's receiving frequencies, thus masking an incoming message.

In a situation such as the above noted one, where interference-free reception is compulsory, it becomes advantageous to be able to anticipate the possible intermodulation products which might be generated and to choose receiving frequencies of different values to thereby avoid the undesirable effects of possible intermodulation products. This anticipation may be performed by actual tests at the particular location concerned, e.g., aboard ship. To date, in fact, such tests have been the manner in which the interference has been anticipated. Naturally, a different technique which would not necessitate the need for the actual shipboard environment is desirable. It is to such a technique that the present invention is directed.

An object of the present invention, therefore, is to provide apparatus for simulating intermodulation frequencies created in non-linear junctions between a plurality of radio frequency signals.

A further object of this invention is to provide an apparatus for simulating intermodulation interference signals which is simple, economical, and useable within a laboratory-type or other convenient environment.

A more particular object of this invention is the provision of apparatus for generating intermodulation product frequencies which occur when a plurality of radio frequency signals are mixed in a non-linear junction.

In accordance with this invention, the above and other objects are achieved by providing a plurality of radio frequency generators for producing a like plurality of different discrete radio frequency signals. The signals so produced are increased in amplitude by a broadband linear amplifier and supplied to a non-linear mixing device. The non-linear mixing device is chosen to have characteristics similar to those of an actual environment, such as that aboard a ship. The resultant host of frequencies is supplied to some monitoring device wherein the results of intermodulation interference between the plurality of radio frequency signals may be observed. Interference-free receiving frequencies may thereafter be chosen in accordance with the results of the simulation.

The above noted objects and features of the present invention will be better understood from the ensuing detailed description and accompanying drawings wherein.

Figures 1, 2:
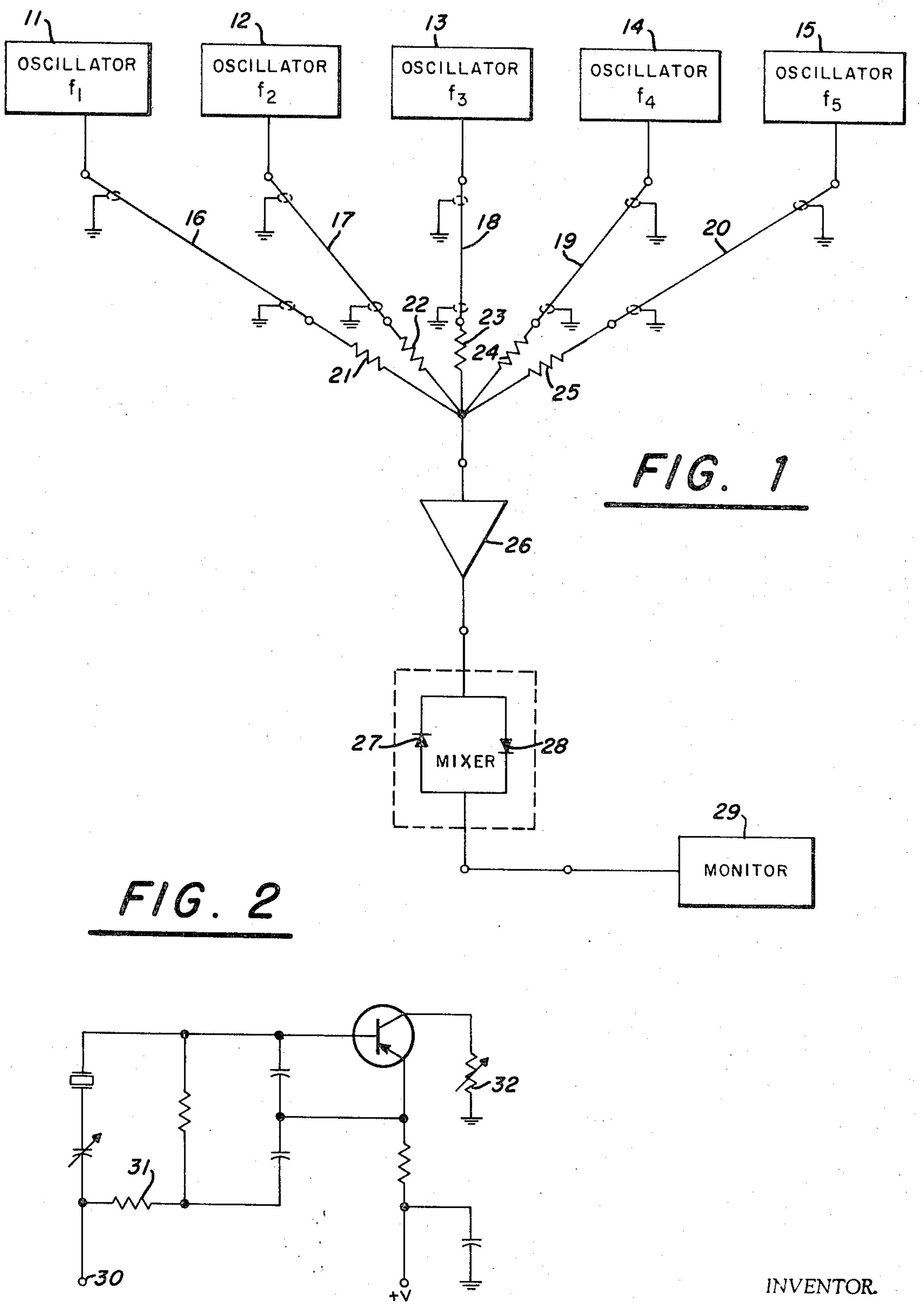
FIG. 1 is a block diagram of one embodiment of the present invention.
FIG. 2 is a schematic diagram of a typical oscillator for use with the embodiment shown in FIG. 1.

Before proceeding with the details of construction, it might be well to consider in detail the nature of the frequencies to be generated in the simulator of this invention. Whenever a frequency $f_1$ is applied to a non-linear element it will be found that the output of this non-linear element will contain not only fundamental frequency $f_1$ but also frequencies harmonically related to $f_1$; that is, frequencies $2f_1$, $3f_1$, $4f_1$ . . . . If two frequencies $f_1$ and $f_2$ (the two being non-harmonically related) are applied to the non-linear element, the output of same will contain not only the harmonic frequencies $2f_1$, $3f_1$, $4f_1$ . . . and $2f_2$, $3f_2$, $4f_2$ . . . but also sum and difference frequencies which are related to the fundamentals in the following manner:

| | |
|---|---|
| $f_1 \pm f_2$ | $3f_1 \pm f_2$ |
| $2f_1 \pm f_2$ | $f_1 \pm 3f_2$ |
| $f_1 \pm 2f_2$ | $3f_1 \pm 2f_2$ |
| $2f_1 \pm 2f_2$ | $2f_1 \pm 3f_2$, etc. |

These frequencies are called intermodulation products or cross-products. The coefficients of the fundamental signals are always integral. The sum of the absolute values of the coefficients of the fundamentals is the order of the intermodulation products, i.e., $f_1+f_2$ and $f_1-f_2$ are both second order products and (assuming a third fundamental $f_3$) $f_1+f_2+f_3$, $f_1-f_2-f_3$, $2f_1+f_3$ are all third order products.

If the non-linear element has a voltage-current characteristic curve which is asymmetrical with respect to the origin, all orders of intermodulation products will appear at the output. If the characteristic curve is symmetrical with respect to the origin only odd-order products will be generated by the element. It was found that in the actual environments being considered, such as that aboard a ship, the naturally occurring non-linear elements have a very high degree of symmetry so that the even-order products, though present at the output, are considerably lower in magnitude than the odd-order products. As noted previously it was found that the naturally occurring non-linear junctions on shipboard are located on riveted and bolted metallic junctions, at areas of rust and corrosion on cable armor, and in various other points in the ship's structure.

The number of second-order intermodulation products theoretically possible with seven fundamental signals is approximately fifty, including the harmonics. The number of fifth-order products is greater than three thousand with the number of products rising very rapidly with increasing order. For example, with seven fundamentals the number of seventh-order products is in the hundreds of thousands and the number of ninth-order products in the millions. It is therefore apparent that as outgoing traffic and transmitter power increase, thus generating higher and higher order of cross products, the problem of intermodulation interference is indeed a serious one. If the intermodulation product frequencies can be predetermined, many potential interference problems can be eliminated by proper choice of receiving frequencies in the communication system. The apparatus of this invention provides an efficient and straightforward device for simulating potential interference from any combination of a number of fundamental signal sources; the practical limit being about twenty sources.

Referring now to FIG. 1, a block diagram of one embodiment of an apparatus constructed within the scope of this invention is shown. The particular embodiment illustrated utilizes five radio frequency signal sources, to wit, oscillators 11 through 15. Each of the oscillators has a fixed output frequency $f_1$, $f_2$, etc. It should be emphasized that five fundamental sources have been shown merely as being exemplary of a typical apparatus and the invention should not be limited thereto.

The respective outputs of oscillators 11 through 15 are supplied via coaxial lines 16 through 20, respectively, to a resistive combining network. The network comprises resistances 21 through 25 and functions to combine the various signals for presentation to the input of a wide band amplifier 26 while maintaining isolation between respective ones of said oscillators. The combining network must be frequency insensitive and must provide sufficient isolation between oscillators so that no uncontrollable interaction between them occurs. The combining network must also provide a proper terminating load for each of the coax lines and be symmetrical so that various oscillators can be withdrawn, replaced and interchanged in any desirable manner. The values of the resistances used in the embodiment shown are dependent on the characteristic impedance of the coaxial lines used. In one model which was built, the coax had an impedance of 50 ohms. This necessitated that the terminating load be 50 ohms and that the output impedance of the various oscillators be essentially 50 ohms. For a terminating load of 50 ohms at each of the inputs to the combining network, each of the resistances 21 through 25 were chosen to have a value of 43 ohms. When looking at any particular one of the inputs, the 43 ohm resistance in series with the effective resistances of the various other branches of the network in parallel approximately matched the 50 ohm termination figure desired. For matching at the input of the coaxial lines, the output of the various oscillators was taken across a resistor having a value equal to that of the impedance of the line or in this case 50 ohms.

The resultant signal from the combining network is amplified, as stated previously, in the broadband amplifier 26 before being presented to the non-linear element or mixer. The amplification is necessary to insure that sufficient signal is present for generation of the higher order intermodulation products. It might be noted that for practical purposes intermodulation products of order higher than the ninth do not contribute significantly to interference in actual situations. Therefore, in constructing the embodiment of the invention shown the amplifier 26 was chosen to have a gain sufficient to produce signals at its output which were of sufficient magnitude to generate ninth order products. Ideally the amplifier should be a linear device, however even if it does generate some of its own intermodulation products because of the nonlinearities in its active elements, the mixing unit is a more efficient generator and thus is actually the controlling non-linear element.

With the signals thus combined and amplified all that remains is generation of the intermodulation products and monitoring the results of such generation. As noted previously, actual environments such as that aboard a ship, contain primarily non-linear elements which have a very high degree of symmetry. The mixer of this invention therefore should have a symmetrical characteristic curve. Solid state diodes are inherently asymmetrical devices but by connecting two in parallel in a front-to-back configuration the resultant symmetrical device is produced. The mixed used in the embodiment shown therefore comprises diodes 27 and 28 so arranged. By connecting a monitor 29 to the output of the mixer the resultant intermodulation product frequencies developed from the particular chosen fundamentals can be immediately observed. Monitor 29 could merely be a receiver capable of tuning the particular spectrum involved or ideally could be a device such as a panoramic receiver capable of visually monitoring the entire spectrum involved.

Any suitable radio frequency sources or oscillators, such as the crystal-controlled variety, could be used as the fundamental sources. In FIG. 2 a schematic diagram of a typical crystal oscillator is shown. Details of its construction and operation are well known in the art and need not be discussed at this time. It can be noted however that the output of the oscillator, represented by terminal 30, is taken across a resistance 31 which has a value equal to the characteristic impedance of the coaxial line used to connect the oscillator to the combining network, as discussed above. It should also be noted that the oscillator schematic shown includes a variable resistance 32 which is effective to control the amplitude of the oscillator output signal. Such amplitude control is desirable since for accurate operation of the simulator apparatus, each of the fundamental signals should be equal in amplitude. In operation, variable resistance 32 would be adjusted to meet such conditions with each of the oscillators.

It is therefore apparent that this invention provides a simple and straightforward manner of predicting potential interference in situations where a plurality of transmitters may be simultaneously operating at a single location.

Although the invention has been shown and described in reference to one particular embodiment thereof it should not be limited therto for various changes and modifications could be made by one skilled in the art without departing from the spirit and scope of this invention as defined in the following claims.

What is claimed is:

1. Apparatus for simulating intermodulation interference created when a plurality of radio frequency sources in a communication system are operated simultaneously comprising:

a plurality of radio frequency generators for producing a like plurality of different discrete frequency signals, a broadband linear amplifier coupled to said radio frequency generators by means of a resistive combining network, and being responsive to said radio frequency signals to produce an output signal representative of said signals increased in magnitude, a nonlinear mixing device having a symmetrical characteristic curve coupled to the output of said amplifier and being responsive to said amplifier output signal to produce output signals consisting of the intermodulation products created when said radio frequency signals are mixed in said nonlinear mixing device, a radio frequency monitoring means, means for coupling said output signals from said mixing device to said radio frequency monitoring means, whereby the results of intermodulation interference between said radio frequency signals may be observed on said monitoring means.

2. The apparatus of claim 1 wherein said radio frequency generators are crystal-controlled oscillators.

3. The apparatus of claim 1 wherein said mixing device comprises a pair of parallel solid state diodes arranged in front-to-back relationship.

4. The apparatus of claim 2 further including;

means for adjusting the magnitude of said plurality of radio frequency signals from said oscillators whereby each of said plurality of signals is equal in magnitude.

References Cited

UNITED STATES PATENTS

| | | | |
|---|---|---|---|
| 2,880,612 | 4/1959 | Coyne et al. | 324—79X |
| 3,036,295 | 5/1962 | Kleist | 331—56X |
| 3,086,166 | 4/1963 | Salvatori | 307—317X |
| 3,332,038 | 7/1967 | Stanley et al. | 331—56X |
| 3,469,198 | 9/1969 | Madsen | 328—133X |

ROY LAKE, Primary Examiner

S. H. GRIMM, Assistant Examiner

U.S. Cl. X.R.

324—77; 328—158; 331—56, 75, 116